Nov. 24, 1953        A. M. GRASS        2,660,510
OSCILLOGRAPH
Filed Oct. 9, 1947
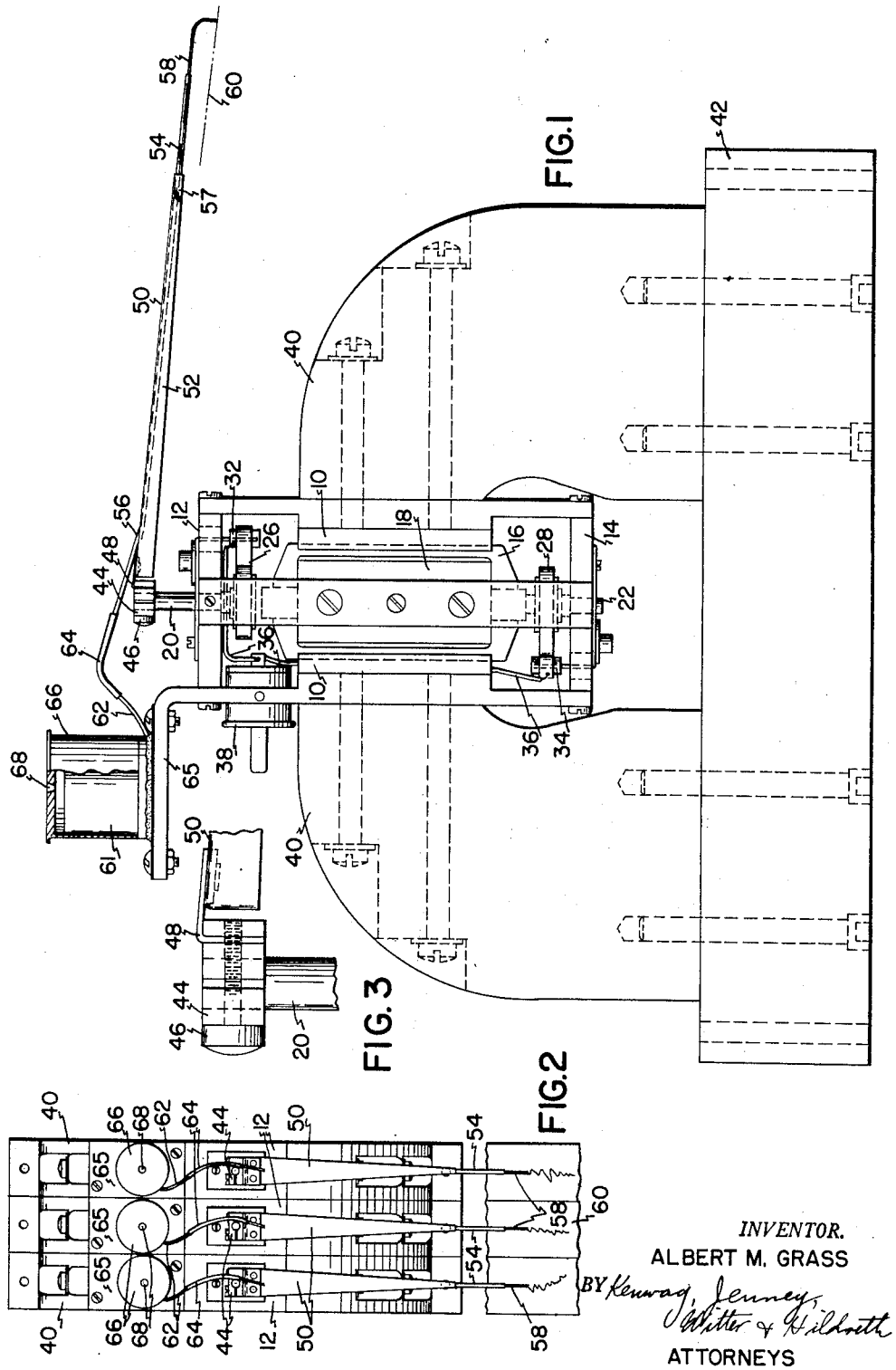
INVENTOR.
ALBERT M. GRASS
BY
ATTORNEYS Patented Nov. 24, 1953

2,660,510

UNITED STATES PATENT OFFICE 2,660,510

OSCILLOGRAPH

Albert M. Grass, Quincy, Mass.

Application October 9, 1947, Serial No. 778,921

1 Claim. (Cl. 346—139)

The present invention relates to oscillographs and more particularly to an oscillograph having a pen for recording an oscillogram on a chart. The oscillograph with which I am here concerned is one particularly useful in medical diagnostic equipment such as an electroencephalograph wherein provision must be made for recording over a number of channels. The ordinary types of oscillograph do not readily lend themselves to arrangements for such multiple-channel recordings.

One object of the present invention is to provide a new arrangement of parts whereby the size of the oscillograph unit is made relatively small so that a number of units may be placed side by side for recording in separate channels.

Another object of the present invention is to provide a pen and inkwell assembly which is useful in any type of recorder whether or not the recorder is of the oscillograph type.

With these objects in view, one feature of the invention comprises an arrangement whereby the oscillograph has a moving coil and the permanent magnet arranged in C or U form is placed in the plane of the coil rather than perpendicular thereto. The face dimensions of the magnet need not be any greater than the projected face area of the coil, whereby the unit is of exceptionally narrow construction. This permits several units to be stacked for multiple channel recording as is required for example in an electroencephalograph.

In constructions of this kind it is necessary that the moving parts constitute a system of relatively high natural frequencies. In other words, the natural frequency of the moving system must be considerably higher than the highest frequency to be recorded. This object is attained, so far as the writing assembly is concerned, by the use of a pen of special construction. The construction is simple and inexpensive and lends itself admirably to the frequency range within which devices of this character are used.

Another feature of the invention comprises a combination pen and inkwell assembly whereby the pen may be suitably primed whenever necessary by means of a movable pressure cap on the inkwell.

Other features of the invention consist of certain novel features of construction, combinations and arrangements of parts hereinafter described and particularly defined in the claim.

In the accompanying drawings Fig. 1 is an elevation of the preferred form of oscillograph unit; Fig. 2 is a top plan view of several units arranged for multiple recording; and Fig. 3 is a detail view of the pen on an enlarged scale.

The oscillograph shown in Fig. 1 comprises a frame having iron side walls 10 which constitute the pole pieces or pole shoes of the permanent magnets. The shoes are held together by top and bottom bearing plates 12 and 14 which complete the frame assembly. Received within the pole shoes is a rotatable moving coil member, the coil being wound upon a nylon form 16. A fixed iron core 18 is received within the form, and the coil is movable between the parts 10 and 18 with as small an air gap as possible.

The coil form is mounted on shafts 20 and 22 which are suitably journaled in the bearing plates 12 and 14. Springs 26 and 28 are coiled about the shafts and have their ends secured to adjustable anchoring devices 32 and 34. They serve to centralize the coil and also to determine the frequency characteristics of the instrument, as will be understood to those skilled in this art. The springs serve as the electrical leads to the coil, and suitable wires 36 are run from the ends of the spring to a connector plug 38.

As shown in the drawings the coil is of considerably greater length (that is, in the axial direction) than thickness. The magnet assembly comprises two magnets 40, preferably of high coercive material. The magnets have faces of dimensions corresponding generally to those of the coil, that is, the magnet faces are relatively high and thin, and their median plane includes the axis of the coil. The magnets are bolted to the shoes 10 and the magnetic circuit is closed through an iron base 42. This magnet and coil arrangement is to be distinguished from the usual unit in which the plane of the magnet is perpendicular to the coil axis. The present invention permits several magnets to be stacked side by side in minimum space, as shown in Fig. 2, whereby the apparatus may be used for multiple channel recording.

The recording unit includes a pen having a split clamp member 44 which is clamped about the shaft 20 of the oscillograph and is held in place by screw 46, as shown in Fig. 3. A spring mounting member 48 in the shape of an angle has a vertical leg secured to the side of the clamp 44 and a generally horizontal leg extending outwardly therefrom. The two legs are preferably at an angle of about 70°. The spring member 48 is preferably of beryllium copper and has considerable flexibility vertically but is relatively stiff laterally. Secured to the horizontal leg of the spring 48 is a pen housing 50 comprising a generally triangular thin aluminum plate having its sides bent down as indicated at 52. An ink-feeding tube 54 passes under the plate 52 and at its rear end extends upwardly through a hole in the plate as indicated at 56. The sides 52 of the housing member are crimped against the forward end of the tube, as indicated at 57. This tube is preferably of about 20 gauge stainless steel. A tube of this size is too large for writing but a tube of smaller size, preferably about 24 gauge is sweated into the end of the tube 54. This smaller tube is indicated at 58 and is provided with a downward curve adapted to engage the chart paper, which is indicated diagrammatically at 60. The large tube 54 provides a channel of considerable size sufficient to convey the ink to the smaller writing tube 58 without clogging.

The triangular construction of the plate 52 is of some importance. As previously stated, the object in devices of this kind is to provide as high a natural frequency as possible. It is also necessary to supply sufficient lateral stiffness so that a proper record will be assured. The triangular form keeps the greatest part of the mass near the axis so that the moment of inertia about the axis is small. The lateral stiffness is determined by the width of the plate. At the point where the greatest stiffness is required, namely, near the axis, the base of the triangle is fairly broad. Near the point where lateral stiffness is of less importance, the plate tapers down to a width which corresponds only to the diameter of the tube. Thus, for a given weight of material there is provided maximum stiffness and minimum moment of inertia.

The mechanical system here shown may have a high amplitude peak at some resonant frequency. The frequency characteristic may be flattened in a satisfactory manner by the use of a compensator, preferably an electrical compensating network in parallel with the coil, as will be understood by those skilled in the art.

The inkwell is shown in Fig. 1. It comprises a cup 61 from which leads a stainless steel tube 62. The tube is curved upwardly in order to prevent ink from running out when the apparatus is not in use. A plastic tube 64 connects the tube 62 and the rear portion of the writing tube 54 of the pen. The plastic tube is sufficiently flexible to permit normal recording movements of the pen. The inkwell is mounted on a bracket 65 above the recording unit.

Received on the cup 61 is an inverted cup 66 constituting a cap member. The top of the cap is provided with a vent opening 68 to prevent entrance of air. In order to prime the pen it is only necessary to place a finger over the hole 68 and press down lightly on the cap. The pressure thus applied to the ink forces the ink out through the tubes 64 and 54 to the pen point. If at any time the pen becomes clogged, it can usually be cleared by operating the cap in this manner. It will be understood that if a single motion of the cap is not sufficient it can be operated as a kind of pump by holding the opening 68 open while the cap is being lifted and closing it when the cap is pushed downwardly. Upon starting it is only necessary to operate the cap to bring the ink to the point, after which the ink flow will continue by normal capillary action.

As heretofore noted, the invention is particularly useful in medical diagnostic equipment, where ruggedness and high sensitivity are required. In some equipment, as in electroencephalographs where multiple records are needed for comparison, the invention is particularly suitable because the magnet arrangement permits manufacture of narrow units that can be readily stacked side by side.

Having thus described the invention, I claim:

A multiple oscillograph assembly comprising a plurality of independent units arranged side by side in mutually contacting relation, each unit including a coil and a pair of permanent magnets, the coil and pole faces of said magnets being relatively long and thin, a long thin base supporting said magnets with the pole faces facing each other, a pivotal mounting for said coil mounted on the pole faces of said magnets to permit rotation about an axis parallel to the long dimension of said coil, each unit including the body of each magnet and said base being limited in its lateral dimension in all parts thereof to an amount not greater than the width of the pole faces, whereby the several units may be arranged side by side in mutually contacting relation with the pivotal axes of the coils parallel, a recording pen for each unit overlying the magnets and actuated by said coil, limited in its motion to an amount not greater than the width of each magnet assembly, whereby the several units may be arranged for multiple channel recording.

ALBERT M. GRASS.

References Cited in the file of this patent

UNITED STATES PATENTS

| Number | Name | Date |
|---|---|---|
| 1,856,699 | Evans et al. | May 3, 1932 |
| 2,030,654 | Rassweiler | Feb. 11, 1936 |
| 2,072,653 | Sherman | Mar. 2, 1937 |
| 2,153,032 | Albin | Apr. 4, 1939 |
| 2,176,777 | Tate | Oct. 17, 1939 |
| 2,183,934 | Heiland | Dec. 19, 1939 |
| 2,199,078 | Lindemann | Apr. 30, 1940 |
| 2,234,430 | Ellis | Mar. 11, 1941 |
| 2,247,214 | Wagar | June 24, 1941 |
| 2,267,356 | Ritzmann | Dec. 23, 1941 |
| 2,308,710 | Nichols | Jan. 19, 1943 |
| 2,351,081 | Swift | June 13, 1944 |
| 2,392,487 | Lee | Jan. 8, 1946 |
| 2,466,691 | Daniels | Apr. 12, 1949 |
| 2,478,329 | Shaper | Aug. 9, 1949 |
| 2,509,185 | Eckel | May 23, 1950 |